Sept. 14, 1948.   E. L. HALVERSON   2,449,474
AUTOMATIC WATER VALVE
Filed Feb. 23, 1945
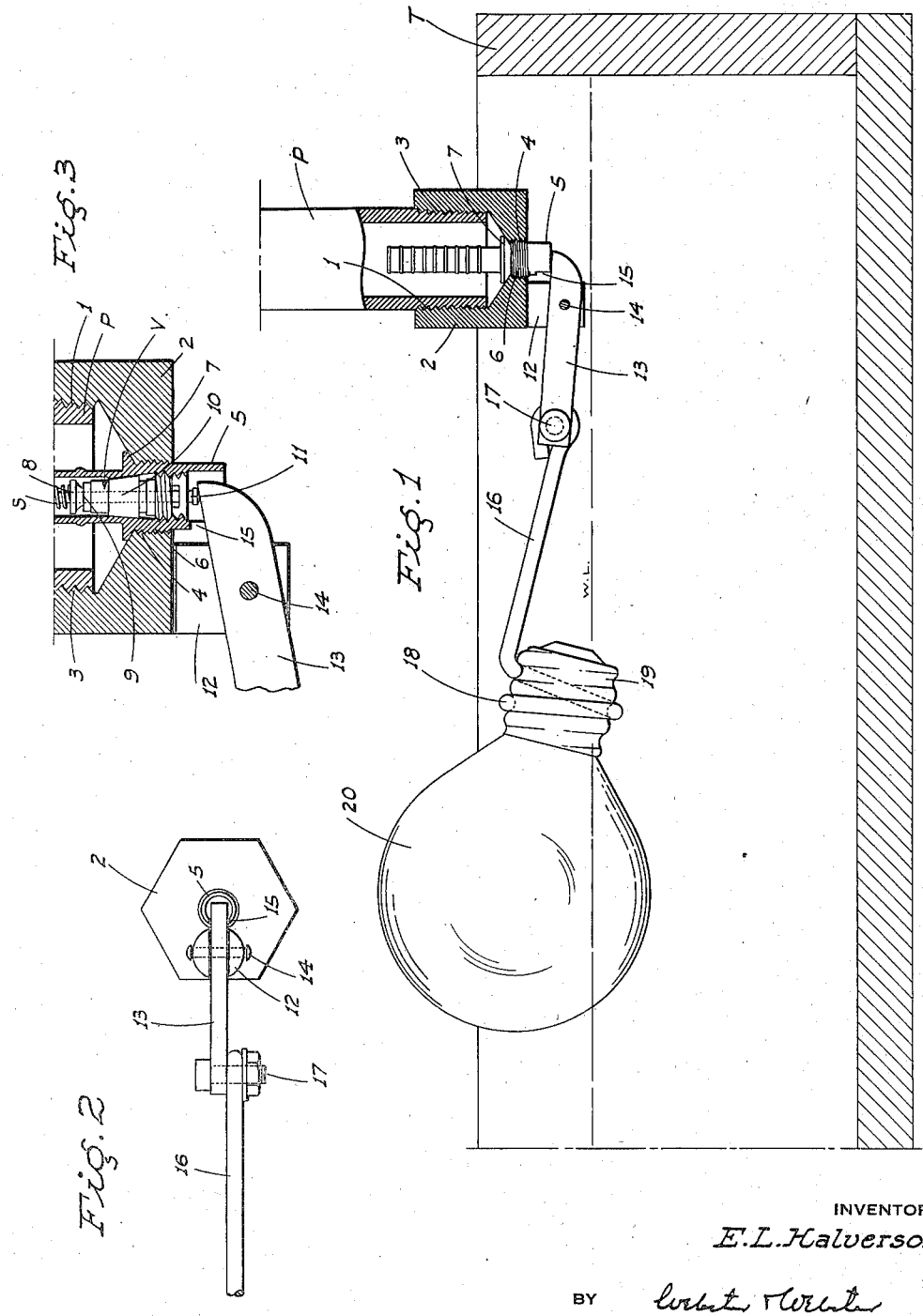
INVENTOR
E. L. Halverson
BY
ATTORNEYS Patented Sept. 14, 1948

2,449,474

UNITED STATES PATENT OFFICE 2,449,474

AUTOMATIC WATER VALVE

Elmer L. Halverson, Sacramento, Calif.

Application February 23, 1945, Serial No. 579,413

1 Claim. (Cl. 137—104)

This invention relates to improvements in water valves and is particularly directed to an automatic water valve for use preferably for controlling the flow of water into watering pans or troughs for poultry, although it probably will be found adaptable to other uses where the automatic control of a flow of water is desired.

The main object of my invention is to provide, as an article of manufacture, a unitary self-contained valve mechanism which may be threaded in its entirety upon the end of any standard water outlet pipe.

A further object is to provide such a device in which the functioning of the valve will be completely automatic and extremely sensitive as it is essential to control the necessary slow flow of water into poultry pans or troughs.

A still further object of the invention is to provide a very simple and ready means whereby the valve parts may be assembled or disassembled as may be necessary to replace worn parts thereof.

A further object of the invention is to produce a simple and inexpensive device and yet one which will be exceedingly effective for the purpose for which it is designed.

These objects are accomplished by means of such structure and relative arrangement of parts as will fully appear by a perusal of the following specification and claim.

In the drawings similar characters of reference indicate corresponding parts in the several views:

Figure 1 is a sectional view of a watering pan or trough showing my improved valve mechanism mounted in connection therewith, the water pipe and valve fitting being shown in section. In this view the parts of the valve structure are shown in the position assumed when the valve is closed.

Figure 2 is a bottom plan view of my improved valve with the float element detached.

Figure 3 is a sectional view of the valve fitting and the pipe to which it is connected, both being foreshortened and showing the valve mechanism in section. In this view the parts of the valve structure are shown in the position assumed when the valve is in open position.

Referring now more particularly to the characters of reference on the drawings, the letter T indicates the water receptacle into which the flow of water is to be controlled by my improved valve mechanism.

The letter P indicates the pipe through which water is to be delivered to the receptacle T and which is of standard structure and projects to a point adjacent the receptacle T for delivery of water thereto. The pipe P is provided with the usual standard end threading 1.

My improved unitary valve structure is made up of a valve fitting 2 which is preferably in the form of a hexagonal cap having standard interior threads 3 adapted to be threaded upon the threads 1 of the pipe P. The material from which this cap is made would be preferably brass but it may, of course, be made of any other suitable metal.

In the end of the cap 2 I provide a threaded orifice 4. The numeral 5 designates a cylindrical valve body. At a point somewhat back from its lower end, this body 5 is provided with exterior threads 6 through the medium of which it may be screwed into the threads 4 of the cap 2, whereby to project a portion of the body 5 beyond the end of the cap 2.

Just above the threads 6 the body 5 is provided with an annular flange 7 which engages the inner side of the closed end of the cap when the body 5 is screwed into said cap 2, so as to make a water-tight joint and to fix the extent of projection of the body beyond the closed end of the cap.

Removably screwed within the body 5 is the valve parts V which may be of any desired construction involving a spring press valve 8 seating against the valve seat 9 and being made water-tight by a suitable gasket 10. Projecting downwardly from the valve 8 is the valve stem 11 which projects into that portion of the body 5 which extends out from the cap 2. Normally the spring S of the valve 8 holds the valve closed and the stem 11 projects well into the extended end of the body 5.

A pair of spaced ears 12 are formed on and project outwardly from the closed end of the cap 2 in substantial parallelism with the extended end of the body 5. A lever finger 13 is mounted on a cross-pin 14 extending through the ears 12 and projects through a slot 15 formed in the projecting end of the body 5 to a point where it engages the end of the valve stem 11.

At the outer end of the lever finger 13 is secured a float rod 16. This rod is connected with the lever finger 13 by a nut and bolt assembly 17, whereby the position of the rod 16 may be readily adjusted with respect to said lever finger 13.

At its outer end the rod 16 is provided with circular convolutions 18 into which may be screwed the threaded end 19 of an ordinary electric light globe 20 which acts as a float. A burned-out globe would naturally be used for this purpose, although any type of globe or any type of float found adaptable could be used at this point.

When the valve unit is assembled on the end of the pipe P, through the adjustment 17 the float 20 is adjusted to that position at which it is desired to have the water level and at which level the lever finger 13 will be out of contact with the valve stem 11. However, when the water in the receptacle T drops below the water level, the float 20 will lower. The weight of the float and its associated parts will then move the lever finger 13 on its pivot 14 and cause it to lift the valve stem 11. Consequently the valve 8 will then be lifted from its seat allowing water to flow into the receptacle T until the proper water level is again reached, whereupon the lever finger will release the valve stem and the valve will close.

From the foregoing description it will be readily seen that my improved valve structure may be made up very cheaply and into a very compact package and distributed through regular channels where it may be purchased and then without any mechanical difficulty whatsoever, mounted upon the end of any standard pipe and adjusted for desired use.

Also should any of the parts become worn there is presented no involved problem of replacing worn parts with new ones. I believe that my improved valve structure is unique and has great utility in the respects noted.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful and upon which Letters Patent is desired:

An article of manufacture comprising a threaded cap for threading onto a standard pipe end, a threaded orifice tapped through the bottom of the cap, a self-contained valve, such valve including a substantially cylindrical casing, a projecting flange on the casing intermediate its ends, threads on the casing below the flange such threads being threaded through the threaded orifice in the cap with the outer end of the casing projecting outside the bottom of the cap, the flange engaging the inner face of the bottom of the cap about the threaded orifice to fix the position of the casing outside the bottom of the cap, removable valve mechanism within the casing including a stem projecting to a point outside the bottom of the cap, and a float controlled lever finger pivoted on the cap and engageable with the valve stem.

ELMER L. HALVERSON.

REFERENCES CITED

The following references are of record in the file of this patent:

UNITED STATES PATENTS

| Number | Name | Date |
|---|---|---|
| 718,550 | Vaughan | Jan. 13, 1903 |
| 1,137,214 | Kelley | Apr. 27, 1915 |
| 1,579,140 | Phillips | Mar. 30, 1926 |
| 1,690,057 | Coleman | Oct. 30, 1928 |
| 1,736,368 | Ricard | Nov. 19, 1929 |
| 1,874,204 | Nesbit | Aug. 30, 1932 |
| 2,079,098 | Woolley | May 4, 1937 |
| 2,136,707 | Owens | Nov. 15, 1938 |

FOREIGN PATENTS

| Number | Country | Date |
|---|---|---|
| 12,801 | Great Britain | Aug. 14, 1889 |